United States Patent
Kablotsky et al.

(10) Patent No.: US 7,107,303 B2
(45) Date of Patent: Sep. 12, 2006

(54) SPARSE ECHO CANCELLER

(75) Inventors: Joshua Kablotsky, Sharon, MA (US); Fabian Lis, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 599 days.

(21) Appl. No.: 10/444,265

(22) Filed: May 23, 2003

(65) Prior Publication Data

US 2004/0260738 A1    Dec. 23, 2004

Related U.S. Application Data

(60) Provisional application No. 60/382,717, filed on May 23, 2002.

(51) Int. Cl.
*G06F 17/10*    (2006.01)
(52) U.S. Cl. ................................... 708/322
(58) Field of Classification Search ............. 708/322
See application file for complete search history.

(56) References Cited

U.S. PATENT DOCUMENTS

| | | | | |
|---|---|---|---|---|
| 4,789,994 A | * | 12/1988 | Randall et al. | 375/233 |
| 5,245,561 A | * | 9/1993 | Sugiyama | 708/322 |
| 5,343,522 A | | 8/1994 | Yatrou et al. | |
| 5,402,496 A | * | 3/1995 | Soli et al. | 381/94.2 |
| 5,572,262 A | * | 11/1996 | Ghosh | 348/607 |
| 5,692,011 A | * | 11/1997 | Nobakht et al. | 375/233 |

OTHER PUBLICATIONS

"Dynamically-Reduced complexity Implementation of Echo Cancelers," Madisetti et al., *ICASSP 86 Proceedings*, pp. 1313-1316, (Apr. 11, 1986).

"Multiple Short-Length Adaptive Filters for Time-Varying Echo Cancellations," *ICASSP*, vol. 4, pp. 161-164, (Apr. 27, 1993).

\* cited by examiner

*Primary Examiner*—Tan V. Mai
(74) *Attorney, Agent, or Firm*—Gauthier & ConnorsLLP (57) ABSTRACT

An echo canceller includes an adaptive digital filter that generates an estimated echo signal $\hat{z}[k]$ in response to (i) a sampled input data sequence $x[k]$ and (ii) an error signal sequence $e[k]$ indicative of the difference between a far end signal sequence $y[k]$ and the estimated echo signal $\hat{z}[k]$. The adaptive filter includes N filter taps that each provide an associated tap output signal, wherein the adaptive digital filter generates the estimated echo signal $\hat{z}[k]$ using the associated tap output signals from M of the N filter taps selected in response to a time delay estimate signal. The adaptive filter computes filter coefficients for each of the M number of the N filter taps using the associated tap output signals from the M number of said N filter taps. The echo canceller also includes a time delay estimator that is responsive to the sampled input data sequence $x[k]$ and the signal sequence $y[k]$, and estimates a plurality of delays within the sequence $x[k]$, and provides a time delay estimate that is indicative of the location of the plurality of delays within the sequence $x[k]$. A summer computes the difference between signal sequence $y[k]$ and the estimated echo signal $\hat{z}[k]$ and provides an output signal indicative thereof. The echo canceller of the present invention can be considered a sparse echo canceller, since the adaptive filter selectively uses a subset of the available filter taps to compute the estimated echo signal. The filter taps are selected based upon time delay estimate data associated with the echo. For example, an adaptive filter having N taps may process signals from M of the N filter taps, where the M taps are selected based upon the time delay estimation from the time delay estimator.

8 Claims, 6 Drawing Sheets

SPARSE ECHO CANCELLER

PRIORITY INFORMATION

This application claims priority from U.S. Provisional application designated Ser. No. 60/382,717 filed May 23, 2002 and entitled Time Delay Estimator, which is hereby incorporated by reference.

CROSS REFERENCE TO RELATED APPLICATION

This application contains subject matter related to the following co-pending applications: Ser. No. 10/055,447 filed Jan. 23, 2002 and Ser. No. 10/444,266 filed even date herewith, both incorporated herein by reference.

BACKGROUND OF THE INVENTION

The present invention relates to the field of echo cancellers, and in particular to an echo canceller having a discrete time adaptive filter having a reduced number of non-zero filter tap weights.

As known, bothersome echoes occur in communication systems, such as telephone systems, that operate over long distances or in systems that employ long processing delays, such as digital cellular systems. The echoes are the result of electric leakage in the four-to-two/two-to-four wire hybrid circuit, due to an impedance mismatch in the hybrid circuit between the local loop wire and the balance network. To reduce the echoes, communication systems typically include one or more echo cancellers.

Figure 1:
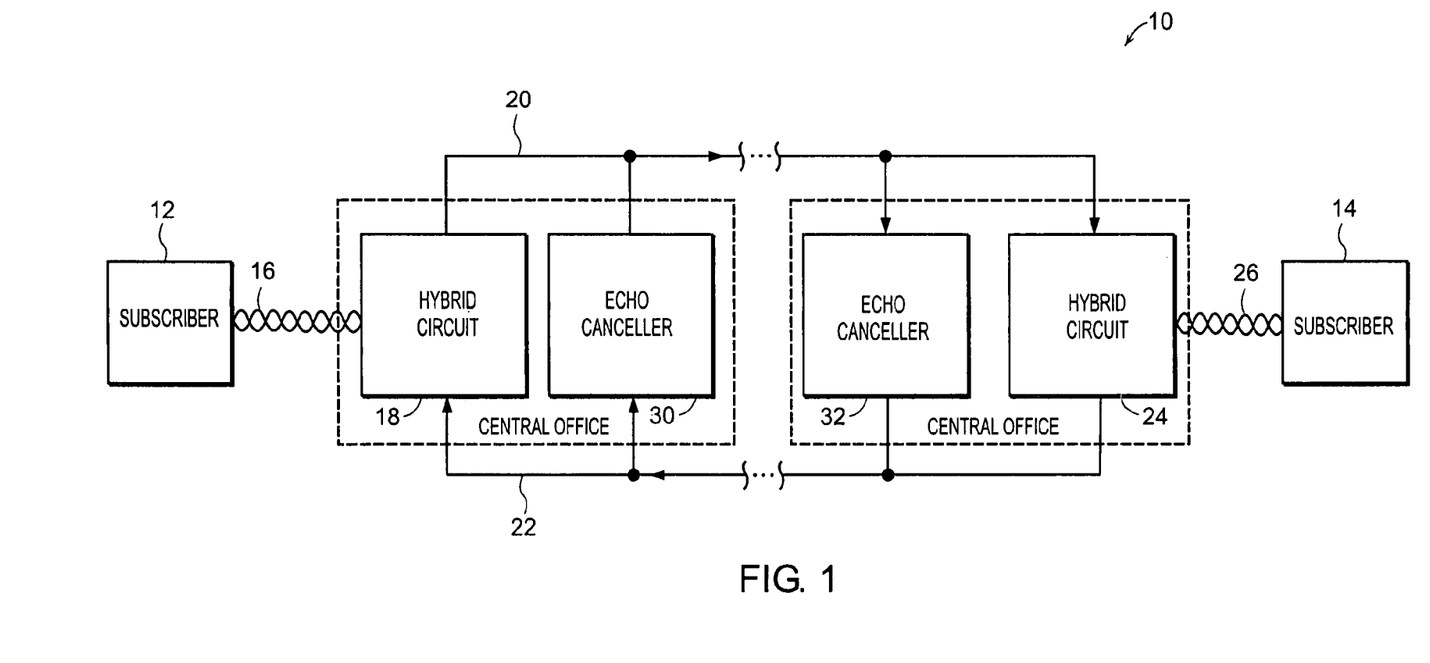
FIG. 1 is a block diagram illustration of a communication system that includes an echo canceller.

FIG. 1 is a block diagram illustration of a communication system 10 that connects at least two subscribers 12, 14. The first subscriber 12 is typically connected to the communication system 10 via a two-wire line 16 and a hybrid circuit 18. The hybrid circuit 18 connects the two-wire line 16 to the four-wire lines 20, 22. The first four-wire line 20 provides a signal to the second subscriber via a second hybrid circuit 24 and a two-wire line 26. Similarly, signals from the second subscriber 14 are routed to the first subscriber 12 over the two-wire line 26, the second hybrid circuit 24 and the four-wire line 20, 22. In one application, the hybrid circuits may be located in the telephone company central offices. To reduce the echo signals coupled by the hybrid circuit due to impedance mismatches, echo cancellers 30, 32 are included to attenuate the undesirable echoes.

Echo cancellers typically include an adaptive filter that generates an estimate of the echo and subtracts the estimate from the return signal. Like any adaptive discrete time filter, the tap weights of the filter are adjusted based upon the difference between the estimate of the echo signal and the return signal. The adaptive filter employs an adaptive control routine to adjust the tap weights in order to drive the value of the difference signal to zero or a minimum value.

A problem with prior art echo cancellers is that they are required to handle echo tail lengths of up to 128 milliseconds per industry standard ITU G. 168. However, in order to meet this requirement the adaptive filter would have to have 1024 taps. Of course providing a filter having such a large number of taps leads to a relatively large computational burden associated with the echo cancellers. In a digital signal processor embodiment (DSP), such an echo canceller would require a relatively large percentage of the DSP's available processing power (e.g., MIPS). For example, using an LMS algorithm with such a large number of tap weights requires a significant amount of processing power (e.g., 24 MIPs).

Similarly, if the 1024 tap adaptive filter is implemented in an application specific integrated circuit (ASIC), a large number of gates would be required.

Therefore, there is a need for an echo canceller that employs a computationally efficient adaptive filter for calculating the estimated echo signal.

SUMMARY OF THE INVENTION

Briefly, according to an aspect of the invention, an echo canceller includes an adaptive digital filter that generates an estimated echo signal $\hat{z}[k]$ in response to (i) a sampled input data sequence $x[k]$ and (ii) an error signal sequence $e[k]$ indicative of the difference between a signal sequence $y[k]$ and the estimated echo signal $\hat{z}[k]$. The adaptive filter includes N filter taps that each provide an associated tap output signal, wherein the adaptive digital filter generates the estimated echo signal $\hat{z}[k]$ using the associated tap output signals from M of the N filter taps selected in response to a time delay estimate signal. The adaptive filter computes filter coefficients for each of the M number of the N filter taps using the associated tap output signals from the M number of the N filter taps. The echo canceller also includes a time delay estimator that is responsive to the sampled input data sequence $x[k]$ and the signal sequence $y[k]$, and estimates delays within the sequence $x[k]$, and provides a time delay estimate that is indicative of the location of the delays within the sequence $x[k]$. A summer computes the difference between signal sequence $y[k]$ and the estimated echo signal $\hat{z}[k]$ and provides an output signal indicative thereof.

The echo canceller of the present invention can be considered a sparse echo canceller, since the adaptive filter of the echo canceller selectively uses a subset (e.g., M of N) of the available filter taps to compute the estimated echo signal. The filter taps are selected based upon time delay estimate data associated with the echo. For example, an adaptive filter having N taps may process signals from M of the N filter taps, where the M taps are selected based upon the time delay estimation from the time delay estimator. The selected M taps represent the estimated temporal locations that include relatively large echo signal values.

Advantageously, the apparatus and method of the present invention significantly reduces the amount of processing performed by the adaptive filter, since the time delay estimator provides an estimate of the most likely M taps associated with the echo, and the adaptive filter then uses only the M taps to compute the filter output. For example, in one embodiment, a 1024 tap adaptive filter (i.e., N=1024) may use only 32 taps (i.e., M=32) to compute the filter output.

These and other objects, features and advantages of the present invention will become more apparent in light of the following detailed description of preferred embodiments thereof, as illustrated in the accompanying drawings.

DETAILED DESCRIPTION OF THE INVENTION

Figure 2:
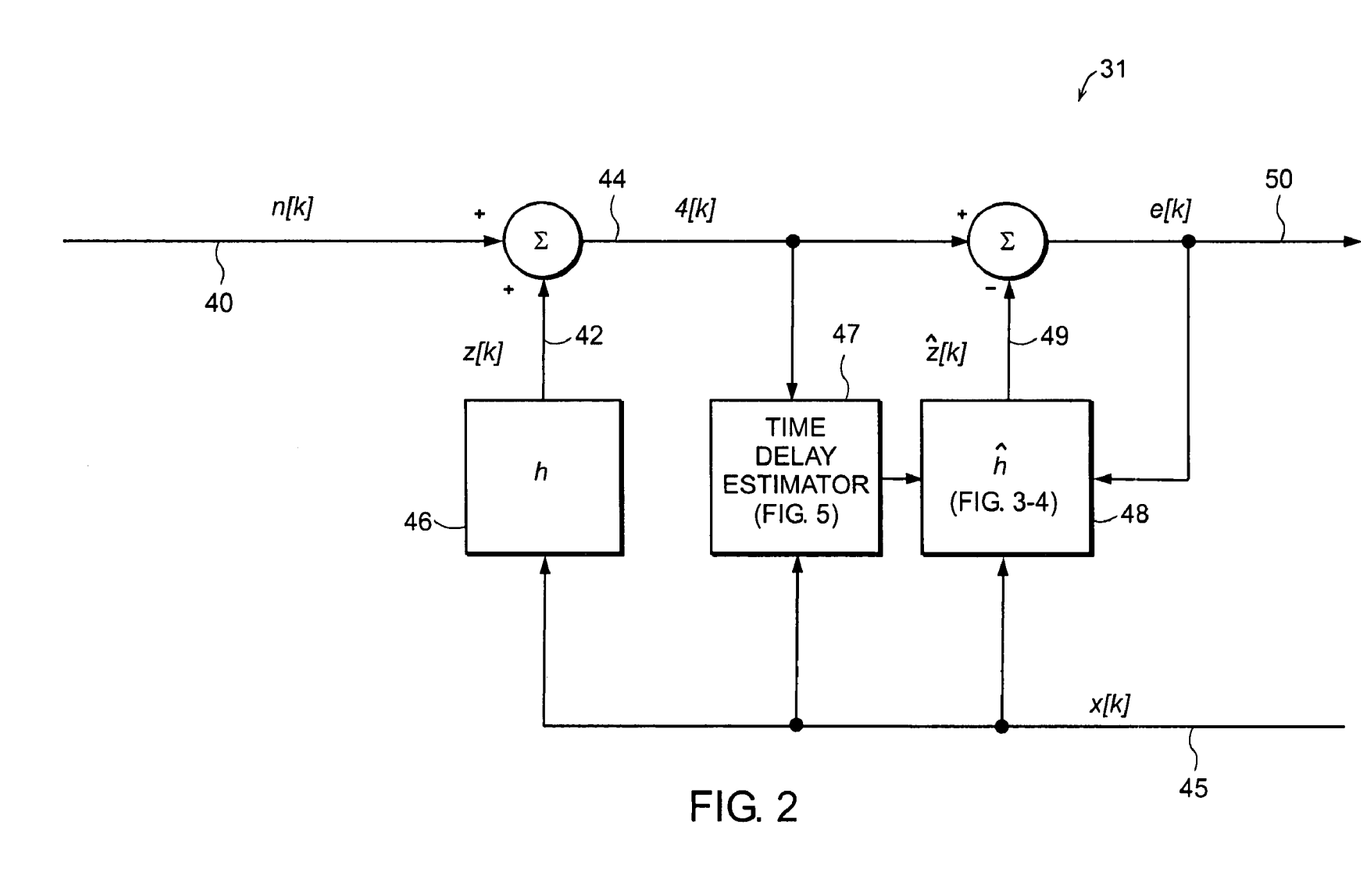
FIG. 2 is a block diagram illustration of an echo canceller.

FIG. 2 is a functional block diagram illustration of an echo canceller 31. The echo canceller 31 receives a near end input signal sequence n[k] on a line 40, and due to the undesirable impedance mismatch of the hybrid circuit, an echo signal sequence z[k] on a line 42 is coupled to the near end input signal sequence n[k] to provide a return signal sequence y[k] on a line 44. The echo signal sequence z[k] on the line 42 is equal to the product of the far end signal sequence x[k] on a line 45 and hybrid circuit impulse response h 46 (i.e., $z[k]=\underline{h}^T[k]\underline{x}[k]$). Significantly, the echo canceller 31 includes an adaptive filter 48 that provides an estimated echo signal sequence ẑ[k] on a line 49. A difference signal e[k] indicative of the difference between the signal sequence y[k] and the estimated echo signal sequence ẑ[k] is computed and provided on a line 50.

Ideally, if the coefficients of the adaptive filter 48 are selected such that the impulse response $\underline{\hat{h}}[k]$ of the adaptive filter is equal to the impulse response $\underline{h}$ 46 of the hybrid circuit, then the value of the difference signal e[k] on the line 50 will be zero in the absence of near end input sequence n[k]. Accordingly, the adaptive filter 48 adapts its tap weights to drive the value of the difference signal e[k] on the line 50 to a minimum/optimum value (e.g., preferably zero).

Figure 3:
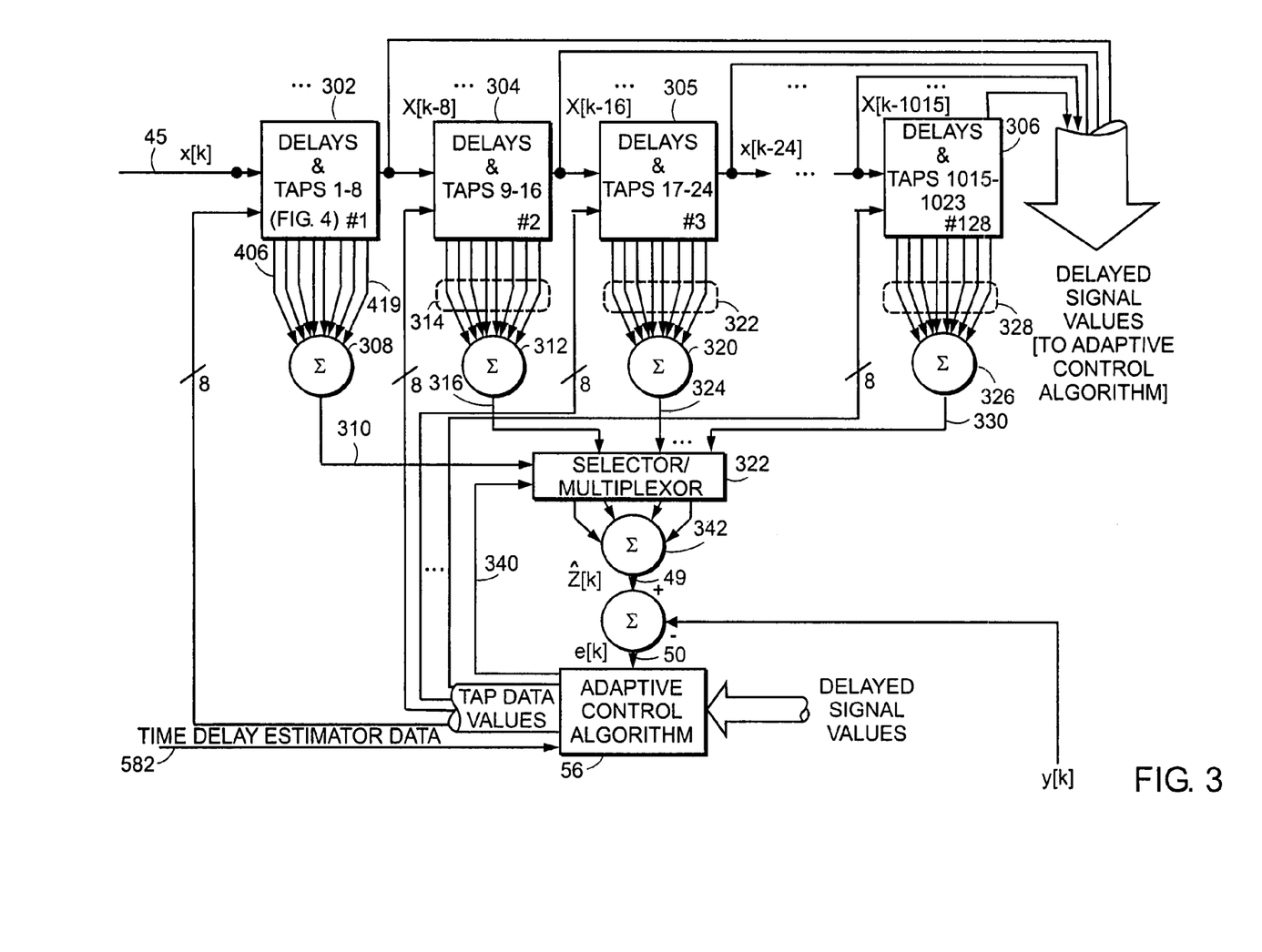
FIG. 3 is a block diagram illustration of an adaptive filter used within the echo canceller of FIG. 2.
Figure 4:
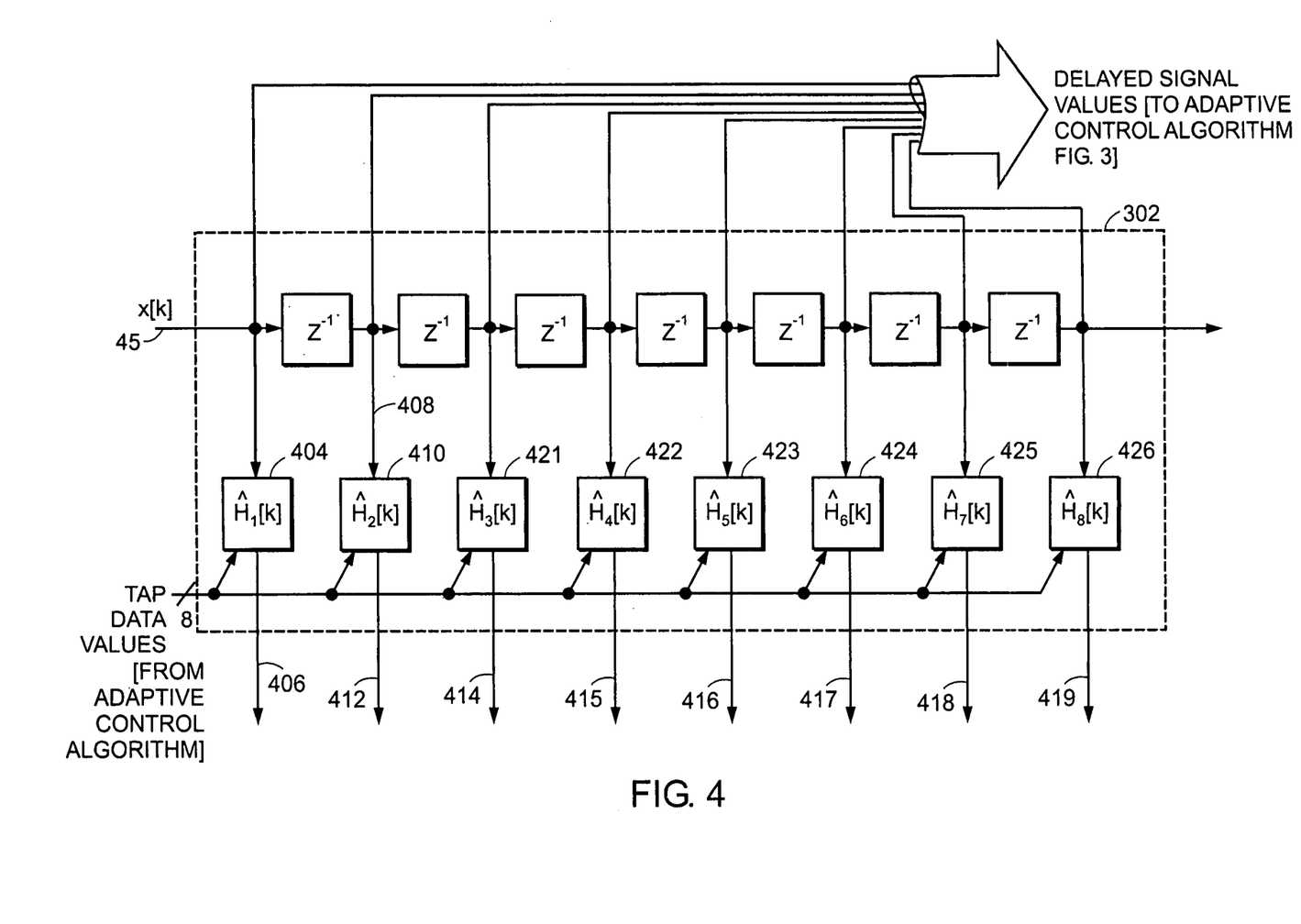
FIG. 4 is a block diagram illustration of the first logical block of delays and filter taps.

FIG. 3 is a block diagram illustration of the adaptive filter 48 used within the echo canceller 31 of FIG. 2. The adaptive filter 48 includes an adaptive control routine 56 that receives the difference signal e[k] on the line 50 and computes a value for each (e.g., 1024) of the N number of coefficient values $\hat{h}_i[k]$ of the adaptive filter. The time delay network and tap weight multipliers of the adaptive filter 48 are shown as being partitioned into a plurality of logical blocks 302–305. For example, each of the M number of logical blocks may include for example eight filter taps. FIG. 4 is a block diagram illustration of the first logical block 302 of delays and filter taps, which receives the far end signal sequence x[k] on the line 45. The signal on the line 45 is input and multiplied by first coefficient value $\hat{h}_1[k]$ 404, and the resultant product is output on a line 406. The far end signal sequence x[k] on the line 45, and past values thereof, are input to the adaptive control routine 56 (FIG. 3). Similarly, a delayed version of the far end signal sequence x[k−1] on a line 408 is multiplied by a second coefficient value $\hat{h}_2[k]$ 410, and the resultant product is output on a line 412. The remaining products associated with the remaining taps within the first delay network 302 are output on lines 414–419, associated with coefficient values $\hat{h}_3[k]$–$\hat{h}_8[k]$ 421–426, respectively.

Referring again to FIG. 3, subsequent logical blocks 304–306 of delays and filter taps are configured and arranged similar to the first logical block 302 (FIG. 4). The output signals on the lines 406, 412 and 414–419 are summed by a summer 308, which provides a first summed signal indicative thereof on a line 310. Summer 312 receives and sums the product outputs 314 from the second logical block 304 and provides a second summed signal on a line 316. Similarly, summer 320 receives and sums the product outputs 322 from the third logical block 305 and provides a second summed signal on a line 324. Summer 326 receives and sums the product outputs 328 and provides a second summed signal on a line 330. Each of the logical blocks provides a summed signal to selector/multiplexor 332. For the filter embodiment having 1024 taps, and each logic block is partitioned to include eight (8) taps, then the selector/multiplexor 332 receives one hundred twenty eight (128) summed signals.

The selector/multiplexor 332 also receives a control signal on a line 340. The control signal identifies which of the (e.g., 128) summed signals input to the selection logic/multiplexor 332 shall be output to a summer 342. The selection criteria shall be discussed hereinafter with respect to the time delay estimator and the adaptive control routine. The summer 342 sums its input signals and provides a summed signal on the line 49 indicative of the estimated echo signal ẑ[k]. In a prior art embodiment, to properly attenuate echo components in a 128 millisecond tail length, the adaptive filter required 1024 taps, which would require 1024 multiplications, and 1024 signal values to be summed to provide the estimated the echo signal. Significantly, a sparse echo canceller of the present invention employs an adaptive filter having a reduced number of taps. Specifically, the time delay estimator determines where in the signal x[k] the dominant echo signal components are, and then uses only non-zero tap weights associated with the locations of the echo components to compute the filter output signal. As a result, rather than performing 1024 multiplications and summing together 1024 signal values (i.e., 1023 additions), the technique of the present invention significantly reduces the number of calculations for each sample k. We shall now discuss the computations that are used to generate the control signal on the line 340.

Figure 5:
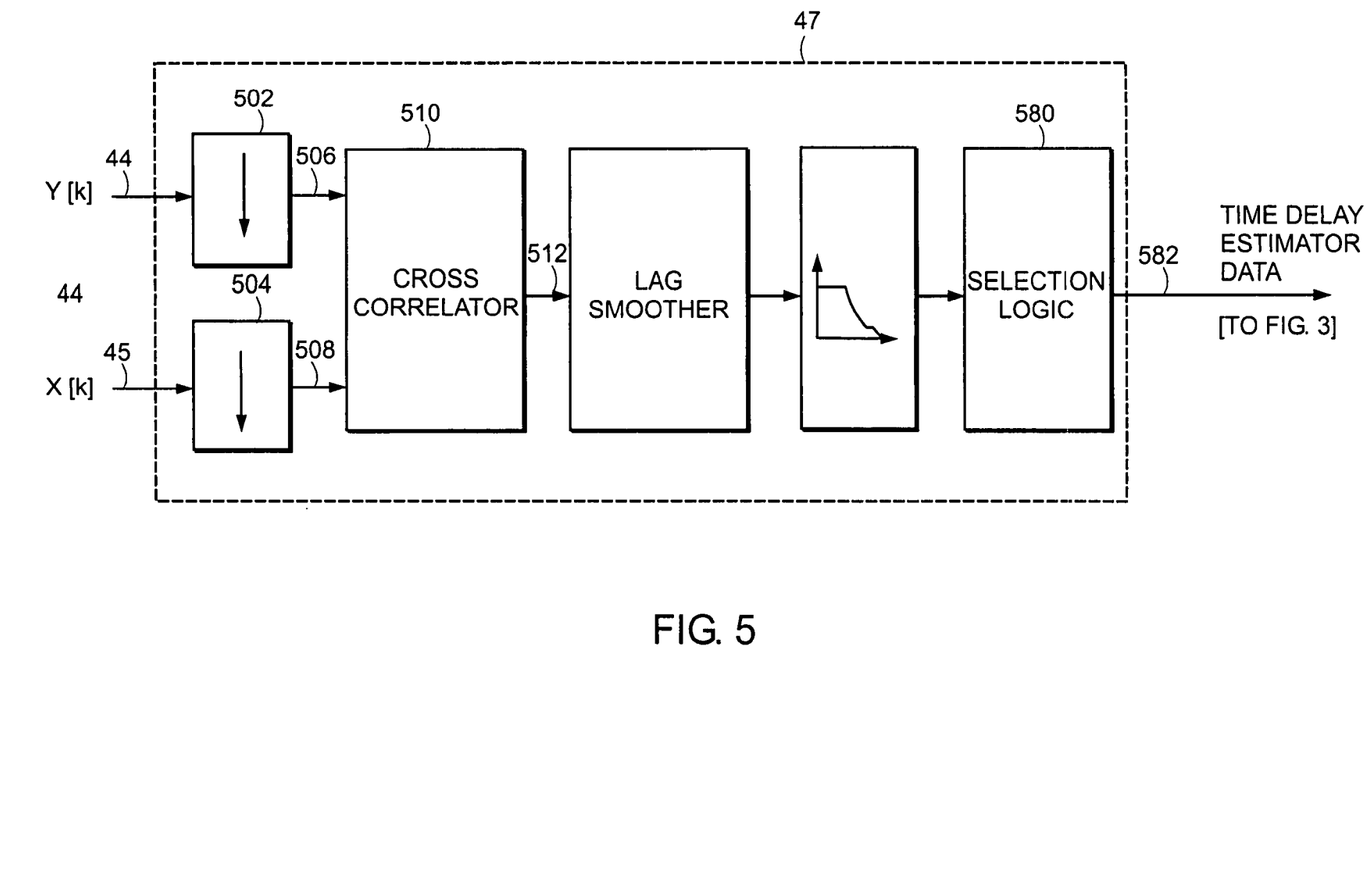
FIG. 5 is a block diagram illustration of a time delay estimator.
Figure 6:
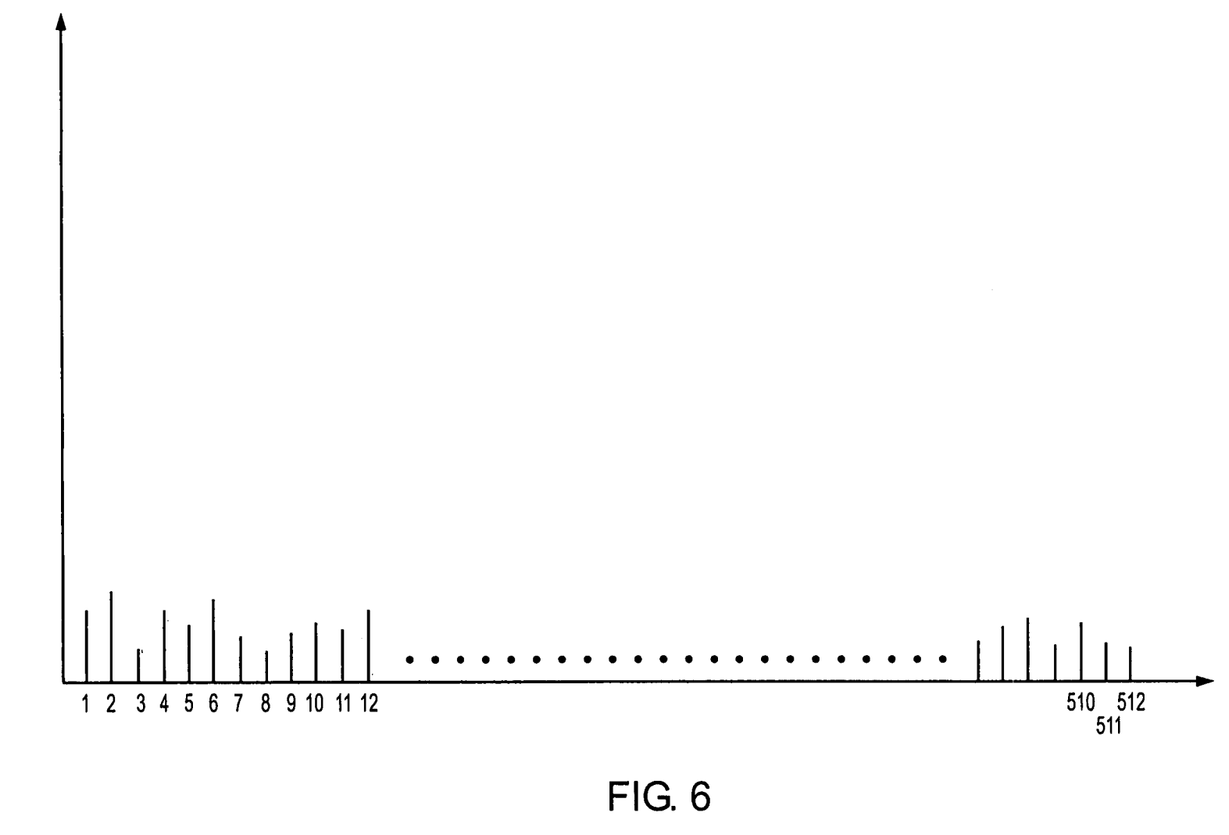
FIG. 6 is a simplified pictorial illustration of the signal y[k].

Referring again to FIG. 2, the time delay estimator 47 receives the signal y[k] on the line 44 and the far end signal x[k] on the line 45. FIG. 5 is a block diagram illustration of an embodiment of the time delay estimator 47. The time delay estimator 47 processes blocks of data to determine where within the spectrum of the block of signal samples of the echo signal components are for the signal y[k]. For example, FIG. 6 is a simplified pictorial illustration of the signal y[k] on the line 44 (FIG. 2). The time delay estimator 47 processes the signal y[k] and the far end signal x[k] in order to estimate where in the signal sequence the echo components are, and provide an indication (i.e., an estimate) of where the echoes are within the signal y[k].

Referring again to FIG. 5, the signal y[k] and the far end transmit signal x[k] on the lines 44, 45, respectively, are input to decimators 502, 504. The decimation may be for example two (2). One of ordinary skill will recognize that of course the decimators are not required, but decimating the signals reduces the subsequent computations required within the time delay estimator 47. In this embodiment the signal y[k] and the far end transmit signal x[k] include 1024 samples, and if the decimation factor is two, the resultant decimated signals on line 506, 508 will include 512 samples. The decimated signals in the lines 506, 508 are input to a cross correlator 510, which provides an output signal sequence on a line 512.

The output signal on the line 512 includes signal values (e.g., peak values of the signal on the line 512) that are indicative of the time delay between the discrete signals x[k] and y[k]. Since voice signals are non-stationary, it would be difficult to use solely the cross correlation to determine time delay as in the prior art. The time delay estimator 47 provides the capacity to determine time delay for discrete signals that are non-stationary.

The cross correlation may be accomplished in a sample-by-sample basis. The correlation computation performed by the sample-by-sample basis may be expressed as:

$$R_\tau[n] = \sum_{i=1}^{n} \lambda^{n-i} x[i] y[i-\tau]$$ EQ. 1 where n is a sample index value, $\lambda$ is a forgetting factor value, and $\tau$ is a lag index value. The sample index is associated with the number of data values in the downconverted signal. In this case, the sample index value n is 512 since, in this embodiment, each of the downconverted signals on lines 506, 508 has 512 data values.

The cross correlation may also be performed on a block-by-block basis, where each block includes signal values over a certain amount of time. The cross correlator 510 computation performed on a block-by-block basis can be expressed as:

$$R_\tau[k] = \sum_{j=1}^{k} \lambda^{k-j} \sum_{i=(k-1)B+1}^{kB} x[i] y[i-\tau]$$ EQ. 2 where k is a block index value, B is a block length value, $\lambda$ is a forgetting factor value, and $\tau$ is the lag index value. In one embodiment, the block length may be 5 ms. This sort of cross correlation gives a spatial dimension in analyzing the two signals x[k] and y[k]. Since the cross correlator 510 also preferably performs averaging on its input values, it can be shown that the recursive relationship is equivalent to relation EQ. 2 as follows:

$$R_\tau[k] = \lambda R_\tau[k-1] + \sum_{i=(k-1)B+1}^{kB} x[i] y[i-\tau]$$ EQ. 3 for performing block-by-block cross correlation.

The cross correlation provides output average values that may either be positive or negative. However, the cross correlation output may also contain effects of time delay that are immersed within the signals x[k] and y[k]. The cross correlation output does not provide an accurate description of time delay effects, because the correlated signals are voice signals that exhibit non-stationary properties. As a result, further analysis is needed to compute the time delay estimate.

The cross correlator 510 output signal is input to a lag smoother 514, which also operates on blocks of data. The lag smoother 514 performs a smoothing operation on the cross correlator output signal. For example, the lag smoother 514 computes averages on the cross correlator output using a sliding window computation. The sliding window is spanned across the cross correlator output signal sequence. This filtering approach produces a smaller set of output data values as compared to the number of data values associated with the cross correlator output. In one embodiment, the lag smoother 514 receives as input 512 data values and outputs 32 data values. The reason is that the lag smoother 514 in this embodiment includes a sliding window sized at approximately 24 data values to create each lag smoother output signal sequence. The sliding window may also overlap with input data values using lags of a previous lag smoothing output to produce a next lag smoothing output. The lag smoother 514 computes the average power of the output of the cross correlator 510. Thus, the lag smoother 514 output values are positive values.

The lag smoother 514 computes the power average of the cross correlated output, and utilizes a sliding window. In one embodiment, the sliding window has a size of twenty-four (24) data samples, however one may of course select a different window size S. The cross correlator 510 outputs approximately 512 data samples, so for the window size of twenty-four (24) the lag smoother 514 provides thirty-two (32) outputs.

The lag smoother 514 may compute the output values as follows:

$$\tilde{R}_r[k] = \sum_{i=(r-1)L-P}^{rL+P} R_i^2[k]$$ EQ. 4 where L is a sliding window size, P is the size of the window overlap, and r is indicative of the number of sets produced by the lag smoother. In this embodiment, the value r spans from 1–32, where each value is uniquely associated with one of the lag smoother outputs. Also, the value of L is 16 and the value of P is 4, thus the sliding window is sized at 24, with an overlap of four (4) data entries on either side of sliding window 30. Since the expression in EQ. 4 performs the averaging of squares of the cross correlated outputs, the outputs of the lag smoother 514 are positive.

The outputs from the lag smoother 514 are input to a time smoother/filter 516, which performs temporal averaging. For example, each of the input signals on a block may be input to an associated single pole low pass filter (e.g., an IIR filter). These filters reduce the variance of the lag smoother outputs. The time smoother 516 is an optional but preferable element of the time delay estimator, since it further reduces the variance, thus providing a better estimation of the time delay.

The time smoother includes a plurality of filters that receives an associated one of the signals from the lag smoother. The time smoothing operation can be expressed as:

$$S_r[k] = (1-\alpha) S_r[k-1] + \alpha R_r[k]$$ EQ. 5 where $\alpha$ is the effective memory length of the each of the plurality of filters, $R_r[k]$ is the set associated with the output of the lag smoother 204, and r corresponds to the indices of the output from the lag smoother. In one embodiment, the value of r ranges between 1 and 32. The time smoother also maintains state information in computing its smoothed output.

Selection logic 580 provides output data on a line 582 that is an estimate of where in the sequence of the signal y[k] the echoes are located. The time smoother 516 may perform other functions that aid the select logic 580 in selecting the associated peak values, if the inputs to the select logic module are from the time smoother 516. For example, if the discrete signals x[k] and y[k] contain low signal values or solely signal noise, these signals will produce outputs across the cross correlator 510, the lag smoother 514, and the time smoother 516 that are null or insignificant. Therefore, it would be necessary for the select logic module 516 not to replace its previous peak values with new peak values that are null or insignificant. The time smoother notifies the select logic module 580 to maintain its previous state information in such circumstances. Another situation is when the outputs to the time smoother are relatively similar same values, thus there is low confidence on these outputs in producing a reliable time delay estimate because there is very little spread between the outputs in the time smoother 516. In this instance, the time smoother notifies the select logic module 580 not to change its state by selecting the peak values from its output. This reduces the likelihood of unreliable outputs by the select logic module 580.

The time smoother 516 may also determine whether the inputs to the time smoother are reliable enough for the select logic module 580 by measuring if the intensity of the inputs to the cross correlator 510 are at an intensity level that is sufficient for selecting peak values at the select logic module 580. The time smoother determines the intensity of the signals on the lines 506, 508, and provides an indication whether the intensity levels are at a level appropriate for continued processing of the inputs. A boolean signal value of "0" on line 520 signifies that the confidence that the inputs to the time smoother will produce reliable time delay estimates is low. Similarly, a boolean value of "1" signifies that the confidence that the inputs to the time smoother will produce reliable time delay estimates is high (i.e., not low).

The outputs of both the lag smoother 514 and the time smoother 516 aid in determining the time delay estimation of non-stationary signals, such as voice signals. The outputs of the lag smoother and the time smoother provide the peak values used for determining time delay estimates of the non-stationary signals. The major difference between the two outputs is that the time smoother aims in the reduction of the variance of the lag smoother outputs to provide a more reliable output to determine the time delay estimates.

The select logic module 580 can either receive the outputs from the time smoother or the lag smoother. In determining the time delay estimate, peak values input to the select logic module 580 are indicative of the time delay estimates. The select logic module 580 selects from its inputs a selective set of high/peak values. For example, the select logic module may select the four signal values. These peak values are stored until a new set of data values that have peak values that are different from those being stored.

The selection logic 580 provides output data on a line 582 that is an estimate of where in the sequence the echoes are located. For example, in one embodiment, the selection logic may provide data that is indicative of four locations in the sequence of the signal where the echoes are. Each of the locations is uniquely associated with one of the M number of logical blocks of delays and taps illustrated in FIG. 3. For example, if the selection logic 580 is configured to provide an output signal that is indicative of four estimated locations of the echoes, then the selector/multiplexor 332 (FIG. 3) selects the four input signals associated with the four estimated locations. That is, if the four estimated locations provided by the time delay estimator are indicative of sequence locations associated with the logical blocks #1, #2, #3 and #128, then the selector/multiplexor 332 (FIG. 3) selects the signals on the lines 310, 316, 324 and 330 (FIG. 3). As a result, the estimated echo signal ẑ[k] on the line 49 includes input from a selected number of the logical blocks, rather than from all the logical blocks.

Significantly, the adaptive filter having N taps processes signals from M of the N filter taps. The M taps are selected based upon the time delay estimation data from the time delay estimator. The selected M taps represent the estimated temporal locations that include echo signal values. Advantageously, the technique of the present invention significantly reduces the amount of processing performed by the adaptive filter, since the time delay estimator provides an estimate of the most likely M taps associated with the echo, and the adaptive filter then uses only the M taps to compute the filter output. For example, in one embodiment, the 1024 tap adaptive filter (i.e., N=1024) may use only 32 taps (i.e., M=32) to compute the filter output.

One of ordinary skill in the art will recognize that the selector/multiplexor 332 (FIG. 3) may be placed in a number of different locations. For example, it is contemplated that the selector/multiplexor 332 may be partitioned and placed upstream of the summer 308, 312, 320, et cetera.

Although the present invention has been shown and described with respect to several preferred embodiments thereof, various changes, omissions and additions to the form and detail thereof, may be made therein, without departing from the spirit and scope of the invention.

The invention claimed is:

1. An echo canceller, comprising:
    an adaptive digital filter that generates an estimated echo signal ẑ[k] in response to (i) a sampled input data sequence x[k] and (ii) an error signal sequence e[k] indicative of the difference between a signal sequence y[k] and the estimated echo signal ẑ[k], said adaptive filter includes N filter taps that each provide an associated tap output signal, wherein said adaptive digital filter generates said estimated echo signal ẑ[k] using said associated tap output signals from M of said N filter taps selected in response to a time delay estimate signal, and said adaptive filter computes filter coefficients for each of said M of said N filter taps using said associated tap output signals from said M of said N filter;
    a time delay estimator responsive to said sequence x[k] and said sequence y[k], that estimates at least one delay within said sequence x[k], and provides said time delay estimate which is indicative of the location of said at least one delay within said sequence x[k]; and
    a summer that computes the difference between said signal sequence y[k] and said estimated echo signal ẑ[k] and provides an output signal indicative thereof.

2. The echo canceller of claim 1, wherein said adaptive filter is implemented in a programmable processing device.

3. The echo canceller of claim 1, wherein said adaptive filter is implemented in an application specific integrated circuit.

4. The echo canceller of claim 1, wherein said adaptive filter is implemented in a field programmable gate array.

5. A sparse echo canceller, comprising:
    an adaptive digital filter that generates an estimated echo signal ẑ[k] in response to (i) a sampled input data sequence x[k] and (ii) an error signal sequence e[k] indicative of the difference between a signal sequence y[k] and the estimated echo signal ẑ[k], said adaptive filter includes N filter taps that each provide an associated tap output signal, wherein said adaptive digital filter generates said estimated echo signal ẑ[k] using said associated tap output signals from a selected number of N filter taps selected in response to a time delay estimate signal;
    means responsive to said sampled input data sequence x[k] and said signal sequence y[k], for estimating the temporal locations of a plurality of echoes within said sequence x[k], and for providing said time delay estimate which is indicative of the temporal locations of said echoes within said sequence x[k]; and a summer that computes the difference between said signal sequence y[k] and said estimated echo signal ẑ[k] and provides an output signal indicative thereof.

6. The sparse echo canceller of claim 5, wherein said N number of filters taps are configured and arranged into M number of groups, each selectable by said time delay estimate signal.

7. The sparse echo canceller of claim 6, wherein said adaptive filter comprises an adaptive control routine that computes a coefficient value for each of said filter taps using a stochastic gradient descent estimator.

8. The sparse echo canceller of claim 7, wherein said stochastic gradient descent estimator comprises a least means squares estimator.

* * * * *